11/23/76 XR 3,992,819

United States Patent [19]

Schmall

[11] 3,992,819

[45] Nov. 23, 1976

[54] APPARATUS FOR EQUALIZING THE RESISTANCE VALUE OF AN ELECTRICALLY CONDUCTIVE LAYER

[75] Inventor: Karl-Heinz Schmall, Baden-Baden, Germany

[73] Assignee: Precitec Gesellschaft fur Prazisionstechnik und Electronik, Germany

[22] Filed: Jan. 22, 1976

[21] Appl. No.: 651,277

[30] Foreign Application Priority Data

Jan. 24, 1975 Germany........................... 2502961

[52] U.S. Cl........................................ 51/8 R; 51/58; 51/59 R; 219/121 L

[51] Int. Cl.$^2$........................ B24C 3/32; B23K 9/00

[58] Field of Search............. 51/10, 33 R, 34 A, 58, 51/59 R, 125, 127, 100 R, 8 R; 219/121 L

[56] References Cited

UNITED STATES PATENTS

| | | | |
|---|---|---|---|
| 3,469,076 | 9/1969 | Saslawsky | 219/121 L |
| 3,577,682 | 5/1971 | Kulischenko | 51/8 |
| 3,691,695 | 9/1972 | Green | 51/8 |
| 3,702,042 | 11/1972 | Cochran | 51/8 |
| 3,916,142 | 10/1975 | Ennis | 219/121 LM |

*Primary Examiner*—Gary L. Smith

*Attorney, Agent, or Firm*—Larson, Taylor and Hinds

[57] ABSTRACT

Apparatus for equalizing the electrically effective value of an electrically conductive layer is described wherein the equalization is effected by a tool, such as a sand-blasting device or laser that does not contact the layer, which is caused to traverse the layer to reduce the thickness thereof under the action of a thrust device acting on a pivoted tool guide under the control of an electrical circuit responsive the resistance of the layer. The tool guide is a two-part telescopic device pivoted about a point displaced above the working end of the tool by an amount that is many times greater than the distance of the working end of the tool above the layer, which distance is kept constant by controlling the length of the telescopic guide. For this purpose a feeler device on the lower part of the guide is maintained in contact with a cam surface which determines the length of the guide against spring reaction as the guide turns about the pivot point. As a safety measure a spring element is interposed between the thrust device and the guide to absorb any unexpected resistance to movement.

8 Claims, 2 Drawing Figures

APPARATUS FOR EQUALIZING THE RESISTANCE VALUE OF AN ELECTRICALLY CONDUCTIVE LAYER

FIELD OF THE INVENTION

The invention relates to an apparatus for equalising the electrically effective value, especially the resistance or capacitance value, of electrically conductive layers by means of a working tool that does not make contact with the layer and operates so as to reduce the width and/or the thickness of the layer. Many such equalising devices are known and usual and are used especially for equalising thick-film or thin-film circuits.

Sand-blasting devices or lasers serve primarily here as tools.

DESCRIPTION OF THE PRIOR ART

Various equalising devices of the kind described are already described in earlier patent specifications by the inventor.

In these, over a substratum on to which the electrically conductive layer is vaporised a sand-blasting nozzle or a laser is held in a guide which ensures parallel displacement and maintenance of constancy of the distance between the tool and the electrically conductive layer during the equalisation operation. For this purpose in these known forms of apparatus a dovetail guide or a parallel guide, in which ease of motion is effected by means of ball bearing guides, is provided which renders possible the plane-parallel displacement of the tool along one axis.

It has also already been proposed to provide such guides on the mounting for the component to be equalised, and accordingly to move this component, and not the tool, during the operation of equalisation.

Both in operation and for production, the use of the known guide and mounting elements has not become established, for reasons of cost. Especially in combination with sand-blasting equipment they have proved trouble-prone and subject to heavy wear, unless high expense is accepted for sealing measures.

SUMMARY OF THE INVENTION

The invention is based upon the problem of avoiding the disadvantages of the prior art, that is to say especially of producing an apparatus of the aforesaid kind which can be produced simply and economically and furthermore works reliably and with low wear.

According to the invention this is achieved primarily in that the tool is secured on a guide which is pivotable about a pivot point, in that the distance between the pivot point and the end of the tool facing the resistance layer is many times greater than the distance between this end and the resistance layer, and the layer and/or the guide comprises a length compensating device to keep the distance constant between tool and resistance layer over the entire range of pivoting.

Quite generally, as may be seen, the mechanical expense for the guide is already considerably reduced in that guide and tool are pivotably secured at one end.

The pivot mounting can be formed simply by a bolt, or in the case of higher precision requirements it can comprise a tapered bush with tapered pin or a ball bearing.

In every case the production expense is greatly reduced in comparison with conventional guides and the operational reliability is increased.

The substantial distance provided between the pivot point and the working end of the tool, in comparison with the tool-layer distance, ensures that, in the pivoting of the guide during the equalising operation, only minor variations occur in the distance between tool and layer.

The possibility has been considered especially in the case of erosion tools, which permit certain tolerances in the distance from the workpiece, of obtaining a satisfactory result merely by the dimensioning of the distance between tool and pivot point, without any additional equalising device.

However it has appeared in practice that optimum results are achievable if in addition to the appropriate dimensioning of the distance between tool and pivot point a length-compensating device is provided on the guide, or on a support for the workpiece.

This can be realised simply by providing the guide with a feeler device, for example a roller, which is pressed under initial pressure against a stop member formed with a cam surface.

If the feeler device is firmly connected to the guide, the cam surface formation of the stop member determines the distance of an end of the guide carrying the tool from the resistance layer to be equalised. As may be seen the cam surface of the stop member can be formed in such a way that all variations of the distance between tool and resistance layer during the pivoting movement can be compensated.

The invention can be realised especially simply if the guide is made in two parts and comprises a sleeve in which an inner part is displaceable against the action of an initially stressed spring.

As may be seen in this case it is readily possible for either the sleeve or the inner part to be secured to the pivot point and the other part in each case to carry the tool.

In a simple manner the arrangement as described renders possible the equalisation of height during the pivoting movement, and furthermore renders possible lifting of the tool, for example for replacement of the workpiece worked, against the initially stressed spring and without any additional equipment.

On lowering the tool, the desired ideal distance of the tool from the workpiece again results, without any play, as soon as the feeler device comes into engagement with the stop member again.

Since the pivoting of the guide about the pivot point can be carried out with relatively low expenditure of force, advantageously a further improvement, resulting in operational safety can be achieved if a resilient element is interposed between a thrust device for pivoting the guide during the equalising operation and the guide. The resilient element transmits the force of the thrust device to the tool guide. This achieves the object that as soon as the tool meets with an unforeseen mechanical obstacle on the component to be worked, no damage to the tool of any kind takes place, since in this case the travel of the thrust device is taken up by the resilient element.

The inventive content and the technical progress of the object of the application are obviously guaranteed both by the new individual features and especially by combination and sub-combination of all utilised features.

DESCRIPTION OF THE DRAWINGS

The invention is explained in greater detail hereinafter with reference to example shown in the accompanying drawings, wherein.

Figure 1:
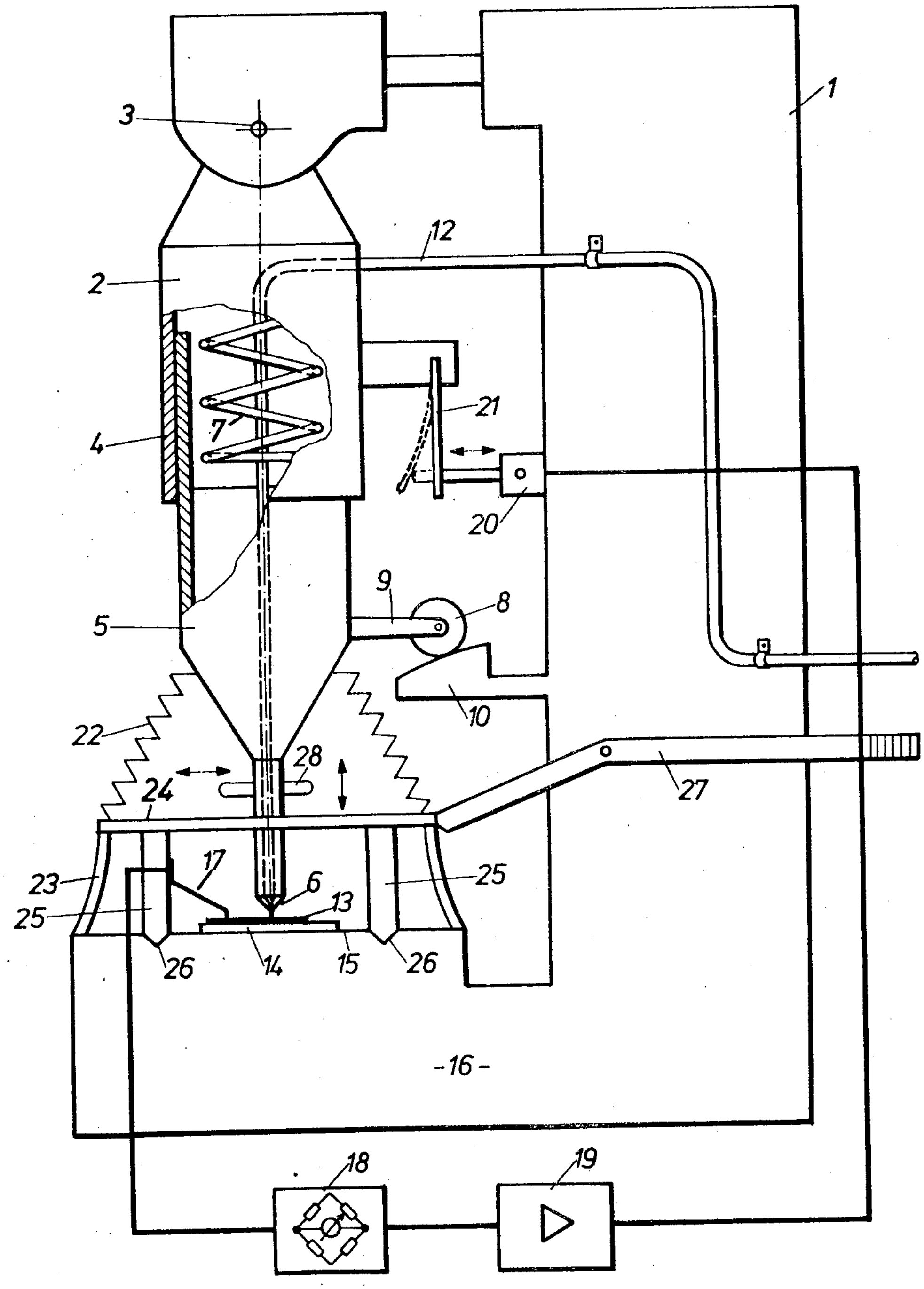
FIG. 1 is a diagrammatic representation of an equalising device.

According to FIG. 1 an equalising device comprises a stand 1 on which a guide 2 is secured for pivoting about a pivot point 3. The guide 2 consists of a sleeve 4 and a tool holder 5, on the lower end of which a sand-blasting nozzle 6 is arranged.

The tool holder 5 is pressed downwards by a spring 7 and is held at the predetermined level by a feeler device 9, provided with a roller 8, in co-operation with a stop member 10. As represented diagrammatically, the sand-blasting nozzle 6 is supplied with an air-sand mixture, supplied by a feed device (not shown), through a conduit 12 in known manner. An air-sand mixture is blasted through the sand-blasting nozzle 6 on to a layer 13 which is applied to a component carrier 14. The component carrier 14 in turn is fixed on a holding plate 16 by stops 15. When the tool holder is in its undisplaced neutral position as shown in FIG. 1, it is over a defined surface position of the layer.

The layer 13 is electrically connected by contact elements 17 with a diagrammatically represented measuring bridge or measuring device 18. The measuring bridge or measuring device 18, which is assembled in a manner known per se, in the course of operation continuously ascertains the electrical resistance value of the layer 13 and in dependence upon the ascertained value sends setting signals to an amplifier 19 which in turn actuates a thrust device 20.

Of course, according to practical requirements, the measuring device can also be designed to detect capacitance values and can provide measured values such for example as voltage, current or frequency.

As shown, the thrust device 20 is connected through a resilient element 21 with the guide 2 so that the guide 2 is pivoted about the pivot point 3 by the thrust device 20 until in known manner the layer 13 is so reduced that its resistance corresponds to the value pre-set in the measuring device 18, whereupon the amplifier 19 is no longer actuated and thus the thrust device 20 is immediately stopped.

Obviously any kind of pneumatic, electric, electromagnetic or hydraulic device can be used for the thrust device.

If the sand-blasting nozzle 6 in its forward movement is unintentionally blocked by another component mounted on the carrier 14, the spring element 21 yields so as to prevent damage or destruction of the sand-blasting nozzle 6 or of the other component.

In fact the spring element 21 is formed so that it takes up the forces necessary for the normal pivoting action without substantial flexure, and thus turns the guide 2 about the pivot point 3 according to the control movement of the forward thrust device 20. However as soon as the movement of the sand-blasting nozzle 6 is blocked for any reason, further action of the thrust device 20 flexes the spring element 21 as shown by chain lines in FIG. 1, without excessive force thereby being transmitted to the guide 2 and without destruction of components.

Obviously in place of the spring element 21 formed as a leaf spring it is also possible for a different kind of spring element to be used; more especially there may be used, for example one or more spiral springs, elastic synthetic plastics or rubber buffers, pneumatic springs or alternatively a clutch device which frees the connection when a pre-settable maximum force is reached.

Figure 2:
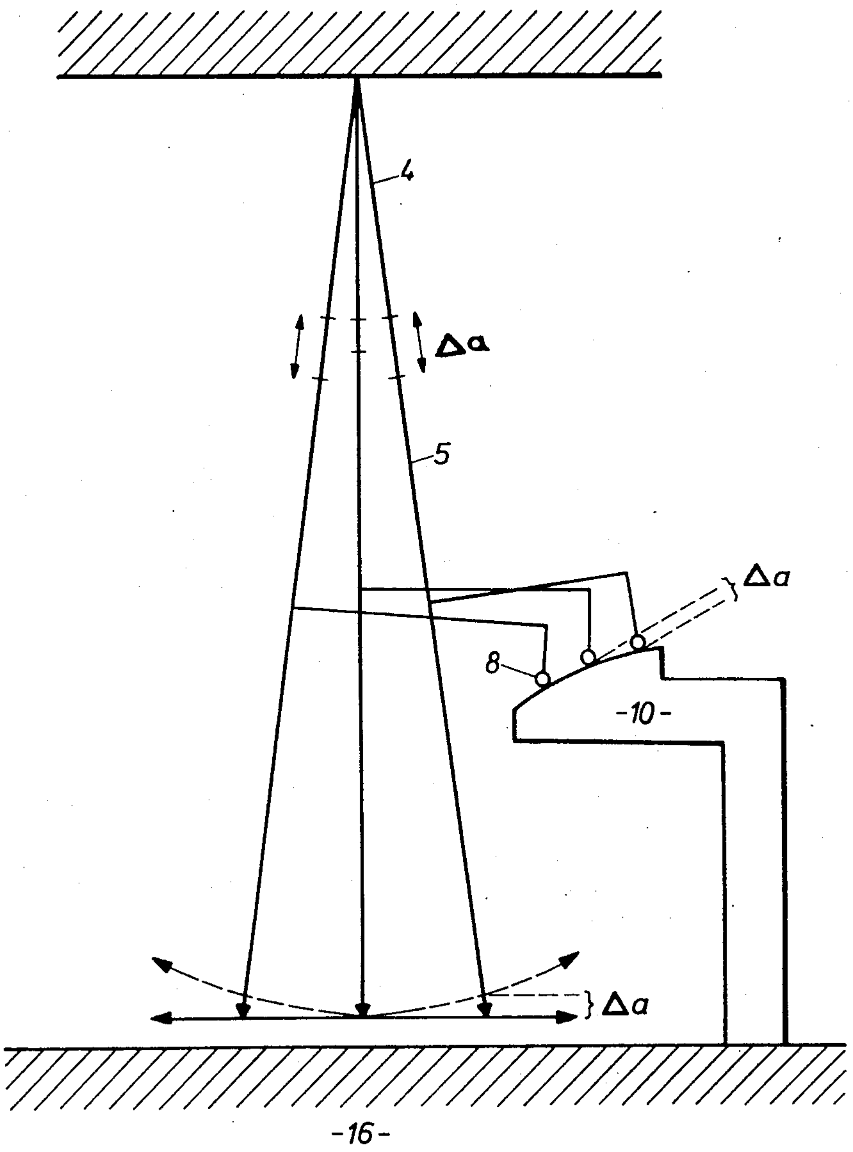
FIG. 2 is a diagram that illustrate the manner of operation of the device according to FIG. 1.

Without a length-compensating device, turning of the guide 2 about the pivot point 3 by reason of actuation by the thrust device 20 would obviously lead to the sand-blasting nozzle 6 moving on the circular path represented by chain lines in FIG. 2, and thus an increase in the distance between sand-blasting nozzle 6 and layer 13 would result. However this could lead to a disadvantageous modification of the erosion effect and bring about irregular erosion of the layer 13.

However as illustrated, the distance of the sand-blasting nozzle 6 from the resistance layer 13 is controlled by the stop member 10. On pivoting of the guide 2 (FIG. 2), the roller 8 travels over a cam surface on the stop member 10 in such a way that the height difference which would otherwise occur is compensated. In FIG. 2 this difference is indicated by the increment $\Delta\alpha$ between the lower end of the nozzle 6 when vertical and the lower end of the nozzle 6 when the tool holder 5 is in one of the inclined positions shown. The telescoping of the tool holder 5 in the sleeve 4, as indicated by the double arrow $\Delta\alpha$ in FIG. 2, enables this compensation to be effected.

As represented diagrammatically, the space around the sand-blasting nozzle 6 is sealed off during operation by an elastic bellows 22 which co-operates with an annular sealing lip 23. The bellows 22 and the annular sealing lip 23 are each secured to a holder 24 which also carries the contact elements 17.

In order to provide satisfactory positioning of the contact elements 17, the holder 24 is provided with tapered positioning pins which enter matching cavities 26 in the plate 16, when the holder 24 is lowered into position on a lever 27.

For the replacement of the component carriers 14 after treatment the holder 24 is raised by the lever 27.

When the holder 24 is being raised, after a short distance it comes into engagement with projections 28 and thus at the same time also lifts the tool holder 5, against the force of the spring 7, so that the sand-blasting nozzle 6 is lifted sufficiently for easy withdrawal and insertion of the component carriers 14. It is however also possible to equip the tool holder 5 separately with its own lifting device, preferably pneumatic, so that the tool can be raised even when the holder remains in its lowest position.

In an obvious modification of the apparatus, with the pivot point 3 of the guide 2 is located in a lower position the feeler device 9 arranged above the pivot point 3 or even on the upper end of the tool holder 5, and the stop 10 correspondingly made concave, ensuring the constancy of the distance between the sand-blasting nozzle 6 and the resistance element or layer 13 to be equalised.

It will also immediately be clear to a person acquainted with the art, for example in the case of equalising devices, which are not to be deflected only along one line but are to be guided over component carriers in two or more directions at an angle to one another to provide in place of a pivot having a fixed axis a ball joint with corresponding degrees of freedom. The stop 10 is then made with a cam surface in the nature of a spherical segment.

A further modification is constructed so that the compensation for variations in the distance between the working end of the tool and the layer 13 is achieved by adapting the mechanism to control the height of the carrier 14.

I claim:

1. Apparatus for equalising the electrically effective value of an electrically conductive layer of solid material, the apparatus comprising a support for holding such a layer in position to present a surface of the layer in a defined surface position, an elongated tool guide, means providing a pivotal mounting for said guide at a pivot point substantially spaced from and on a notional line normal to said surface position, a tool operative to reduce the thickness of a layer on said support while said tool is displaced from said surface position, said tool being mounted at an end of said guide remote from said pivot point and having a working end presented towards said surface position, and the distance between said pivot point and said working end of said tool being many times greater than the distance between said working end and said surface position when said tool is operative, compensating means for maintaining the distance between said working end and said surface position constant throughout movement of said guide about said pivot point for causing said tool to move over said surface position, and means responsive to the electrical resistance of a layer on said support for effecting said movement.

2. Apparatus according to claim 1, in which said guide comprises a member pivoted about said pivot point, a tool holder mounted for sliding movement on said member towards and away from said pivot point, said tool being mounted on said tool holder, and in which said compensating means comprise a fixed stop member, and a feeler device mounted for movement with said tool holder while contacting said stop member, the apparatus further comprising resilient means acting on said tool holder to maintain said feeler device in contact with said stop member, said stop member and said feeler device being formed to control the movement of said tool holder towards and away from said pivot point, whereby said tool is maintained at a controlled working distance from said surface position when traversing said surface position.

3. Apparatus according to claim 2, in which said stop member is formed with a cam surface engaged by said feeler device and shaped to maintain said tool at said controlled working distance from said surface position.

4. Apparatus according to claim 2, in which said stop member is formed with a cam surface and said feeler device comprises an arm fixed to said tool holder and a roller carried by said arm for rolling along said cam surface when said guide turns about said pivot point, said cam surface being shaped to maintain said tool at said controlled working distance from said surface position.

5. Apparatus according to claim 2, in which said member is a sleeve and said tool holder comprises a tubular portion arranged telescopically in said sleeve, said resilient means being a stressed spring interposed between said sleeve and said tubular portion.

6. Apparatus according to claim 1, in which said responsive means comprises a thrust device and a spring element interposed between said thrust device and said guide, said thrust device being operative to move said guide about said pivot point for causing said tool to move over said surface position and said spring element being arranged to yield in the event of such movement being blocked.

7. Apparatus according to claim 2, in which said tool holder is arranged to be moved towards said pivot point against the action of said resilient means while said feeler device separates from said stop surface and said tool is withdrawn from said surface position to permit the substitution of an unworked layer of material on said support for a layer of material already worked on by said tool.

8. Apparatus for equalising the electrically effective value of an electrically conductive layer of solid material, the apparatus comprising a stationary support for holding the layer in position to present a surface of the layer in a defined surface position, a two part telescopic tool guide, means providing a pivotal mounting for one part of said guide at a pivot point substantially spaced from and on a notional line normal to said surface position, a tool operative to reduce the thickness of a layer on said support while said tool is displaced from said surface position, said tool being mounted at an end of the second part of said guide remote from said first part, and said tool having a working end presented towards said surface position, and the distance between said pivot point and said working end of said tool being many times greater than the distance between said working end and said surface position when said tool is operative, a fixed stop member formed with a cam surface, a feeler device mounted on said second part of said tool guide and contacting said cam surface, resilient means acting on said second part of said guide to maintain said feeler device in contact with said stop member, a thrust device for causing said tool guide to swing about said pivot point carrying said tool over surface position while said cam surface acts on said feeler device to maintain the distance between said working end of said tool and said surface position constant, a spring element interposed between said thrust device and said tool guide to yield if the movement of said tool guide about said pivot point is blocked, and electrical circuit means responsive to the electrical resistance of a layer on said support for controlling said thrust device.

* * * * *

UNITED STATES PATENT OFFICE

CERTIFICATE OF CORRECTION

PATENT NO. 3,992,819

DATED November 23, 1976

INVENTOR(S) : Karl-Heinz Schmall

It is certified that error appears in the above-identified patent and that said Letters Patent are hereby corrected as shown below:

Please change the name of the Assignee to read

-- Precitec Gesellschaft fur Prazisionstechnik und Electronik MBH--

Signed and Sealed this

Third Day of May 1977

[SEAL]

*Attest:*

RUTH C. MASON
*Attesting Officer*

C. MARSHALL DANN
*Commissioner of Patents and Trademarks*